Nov. 3, 1936.　　　　　E. M. HICKS　　　　　2,059,866
BUS BODY
Filed July 27, 1936
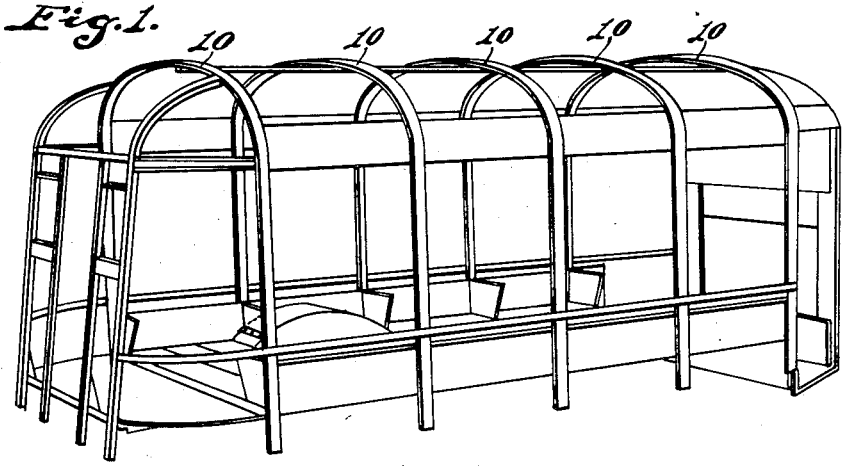
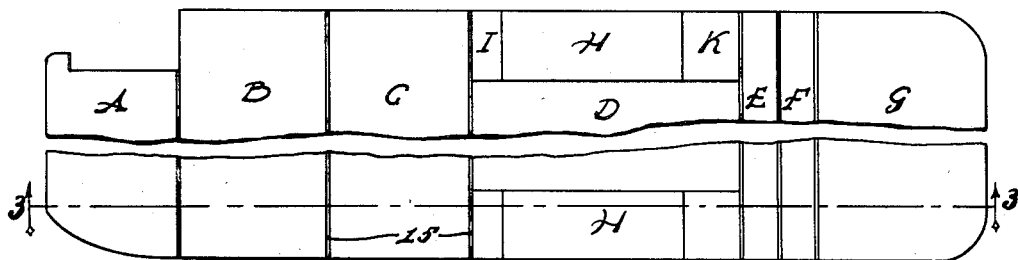
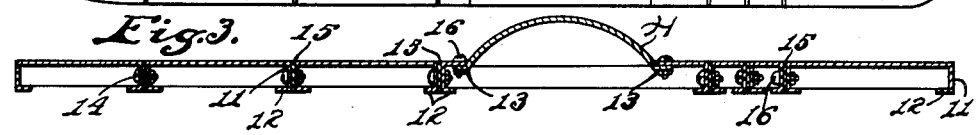
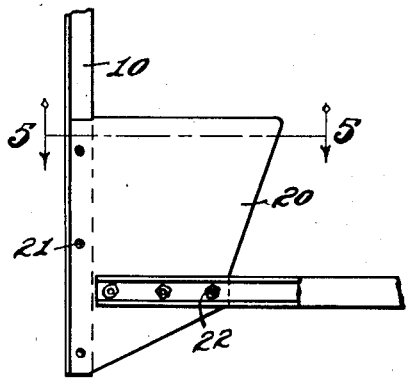
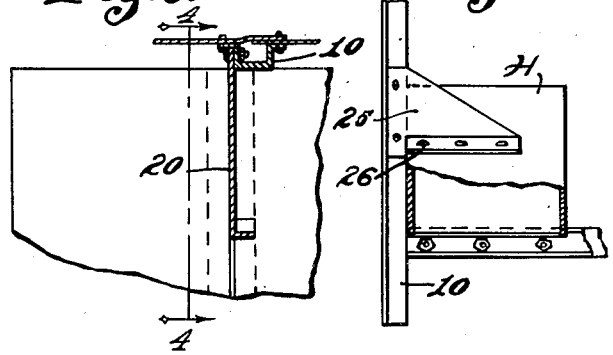
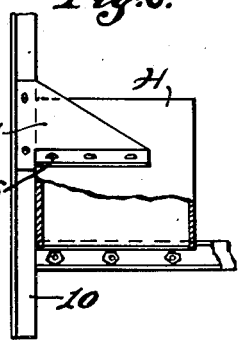
INVENTOR.
Earl M. Hicks,
BY
Hood & Hahn.
ATTORNEYS.

Patented Nov. 3, 1936

2,059,866

UNITED STATES PATENT OFFICE 2,059,866

BUS BODY

Earl M. Hicks, Lebanon, Ind.

Application July 27, 1936, Serial No. 92,724

4 Claims. (Cl. 296—28)

Transportation of school children is provided, in many parts of the country, by motor vehicles, the bus-type passenger carrying bodies of which are owned by the school authority, while the motor-driven chassis are owned by private parties who provide the transportation service on contract.

It often occurs that various bidders own and operate chassis of different wheel bases and, in some instances, a single bidder may own various chassis of different wheel bases.

The object of my present invention is, therefore, to provide a bus body structure of such character that it may be readily modified to fit any one of a number of chassis of different wheel bases, so that a school authority in possession of a plurality of bus bodies may be in a position, because of the ready adaptability of those bodies, to receive transportation bids from a larger number of chassis owners than would be possible if the bus bodies were not so readily convertible.

The accompanying drawing illustrates my invention:

Fig. 1 is a perspective view of the frame work of a bus body embodying my invention;

Fig. 2 is a plan, diagrammatic in character, of the floor construction embodied in Fig. 1;

Fig. 3 is a longitudinal section on line 3—3 of Fig. 2;

Fig. 4 is a fragmentary vertical section on line 4—4 of Fig. 5;

Fig. 5 is a fragmentary section on line 5—5 of Fig. 4; and

Fig. 6 is a vertical section transversely through one of the wheel housings.

In the drawing, 10—10 indicates a plurality of body bows connected by suitable longitudinally extending connecting elements, the details of which are not important in the present invention, into a passenger enclosing canopy-like structure provided with a passenger supporting floor, the details of structure of which make possible the ready adaptability of the structure to chassis of different wheel bases.

To this end, the floor comprises a plurality of transversely extending sections A, B, C, D, E, F, and G, sections A and G, respectively, being the front and rear sections, section D being the medial section in the rear wheel housing zone; sections B and C being preferably of identical dimensions of comparatively large extent longitudinally of the vehicle, and sections E and F being of lesser dimensions longitudinally of the vehicle.

Section D is supplemented at each side by an arched wheel housing section H and by front and rear floor plate sections I and K, respectively, section K having a dimension longitudinally of the vehicle preferably about twice the corresponding dimension of the section I.

Sections A, B, C, E, F and G are preferably of comparatively light gauge sheet metal which, at each edge are downturned at 11 and inwardly turned at 12.

Sections I and K are downturned at 11 and inwardly turned at 12 along only one edge. Section H is arched and provided at each edge with horizontal lips 13—13. Section D is similar to sections B and C except that it is narrower transversely of the floor and longer longitudinally of the floor than sections B—C.

Sections A, B, and C are assembled by connectors 14 with intermediate spacers 15 and these connectors may be permanent, as by rivets, whereas sections D, E, F, G, H, I, and K are provided with readily removable connectors, as by threaded bolts 16.

The over-all dimension of the group comprising sections D, E, F, H, I, and K, longitudinally of the vehicle, is such as to permit the wheel housing sections H to be shifted longitudinally of the vehicle throughout the general range of the wheel base variations of chassis commonly in use.

All of the bows 10, except the second bow from the rear, are firmly attached to the adjacent floor plate elements by gusset plates 20 attached to the bows at 21 and between the adjacent floor plate sections, as indicated at 22. The shape of these gusset plates may be varied according to the character of the seat structure desired, without departing from my invention. In the present drawing, I have shown these gusset plates of such form that their upper edges form a support for longitudinally extending seat elements (not shown).

It will be noted that, by the above arrangement, the group comprising sections H, I, and K may, by reversing sections I and K relative to section H, be rearranged to permit a longitudinal shifting of the wheel housing sections H, a distance equal to the difference in longitudinal dimensions of sections I and K. It will also be noted that the group comprising section D and two sets of sections H, I, and K may be longitudinally shifted by shifting either or both sections E and F to positions forward of the above-mentioned group and that, in either of these groupings, reversal of sections I and K relative to section H permits the further relocation of sections H so that, by rearranging sections D, E, F, H, I, and K, to a greater or lesser extent, the wheel housing sections H may be readily properly positioned to overlie the rear wheels of the chassis.

The superstructure, comprising the bows 10 and the connecting longitudinal elements, is sufficiently rigid to permit no connection between the lower ends of the legs of the second to the rear bow 10 with the floor structure but, if desired, special connector elements 25 may be provided to connect the depending legs of this bow with the upper surface of the adjacent wheel housing H or sections I or K, said sections being appropriately perforated for the reception of the connector elements 26.

I claim as my invention:

1. A vehicle body comprising a floor composed of a plurality of transversely extending elements connecting in series, said elements comprising a group composed of a medial section having a dimension transversely of the vehicle less than the distance between the rear wheels of a supporting chassis, and two flanking groups, each comprising an arched wheel housing and a floor plate section.

2. A vehicle body comprising a floor composed of a plurality of transversely extending elements connecting in series, said elements comprising a group composed of a medial section having a dimension transversely of the vehicle less than the distance between the rear wheels of a supporting chassis, and two flanking groups, each comprising an arched wheel housing and two reversible floor plate sections, together with readily removable connectors permitting regrouping of said narrow intermediate sections and the flanking sections.

3. A vehicle body comprising a floor composed of a plurality of transversely extending elements connecting in series, said elements comprising a group composed of a medial section having a dimension transversely of the vehicle less than the distance between the rear wheels of a supporting chassis, and two flanking groups, each comprising an arched wheel housing and a floor plate section, and two relatively narrow full width floor sections, together with readily removable connector elements permitting regrouping of said narrow medial sections, the flanking sections, and said two relatively narrow full width sections.

4. A vehicle body comprising a floor composed of a plurality of transversely extending elements connecting in series, said elements comprising a group composed of a medial section having a dimension transversely of the vehicle less than the distance between the rear wheels of a supporting chassis, and two flanking groups, each comprising an arched wheel housing and two reversible floor plate sections, and two relatively narrow full width floor sections, together with readily removable connector elements permitting regrouping of said narrow medial sections, the flanking sections, and said two relatively narrow full width sections.

EARL M. HICKS.